March 9, 1926.  1,575,860
T. B. MONK
INTERNAL COMBUSTION ENGINE
Original Filed April 5, 1922  3 Sheets-Sheet 2

March 9, 1926.
T. B. MONK
1,575,860
INTERNAL COMBUSTION ENGINE
Original Filed April 5, 1922   3 Sheets-Sheet 3
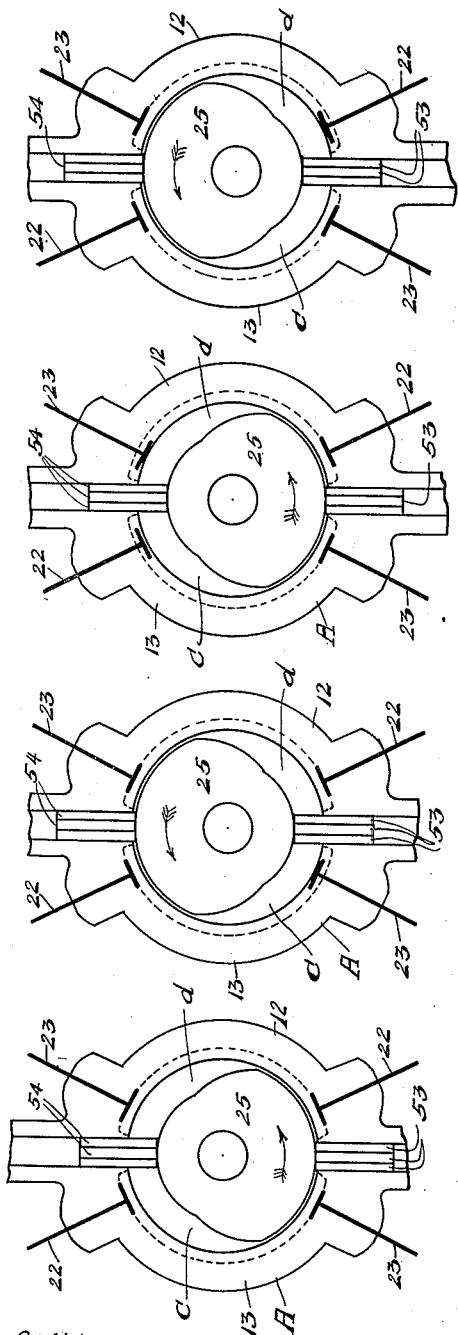
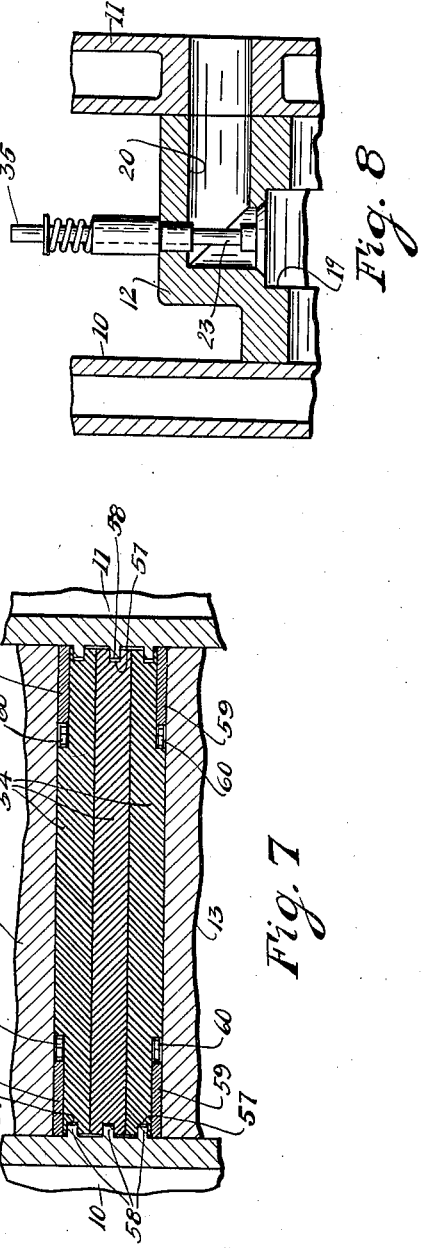

Patented Mar. 9, 1926.

1,575,860

UNITED STATES PATENT OFFICE.

TRAVIS B. MONK, OF CRETE, ILLINOIS.

INTERNAL-COMBUSTION ENGINE.

Application filed April 5, 1922, Serial No. 549,912. Renewed October 21, 1925.

*To all whom it may concern:*

Be it known that I, TRAVIS B. MONK, a citizen of the United States, and a resident of Crete, county of Will, and State of Illinois, have invented certain new and useful Improvements in Internal-Combustion Engines, of which the following is a specification.

My invention relates to new and useful improvements in internal combustion engines of the rotary type, and has for its principal object the provision of an improved construction of this character which will be economical in manufacture and highly efficient in use.

A further object of the invention is the provision of an engine of this type provided with oppositely arranged combustion chambers which alternately coact on a single piston to impart driving power to the drive shaft of the engine.

Other objects will appear hereinafter.

The invention consists in the combinations and arrangements of parts hereinafter described and claimed.

The invention will be best understood by reference to the accompanying drawings forming a part of this specification, and in which, Fig. 1 is an elevational view of a rotary engine, embodying the invention, and taken substantially on line 1—1 of Fig. 2;

Fig. 2 is a sectional detail view, of the same, taken substantially on line 2—2 of Fig. 1.

Figs. 3 to 6 inclusive are diagrammatical views showing the various cycles of operation necessary to obtain an explosion.

Fig. 7 is a fragmentary sectional detail view taken substantially on line 7—7 of Fig. 2.

Fig. 8 is a fragmentary sectional detail view taken substantially on line 8—8 of Fig. 1.

Figure 1:
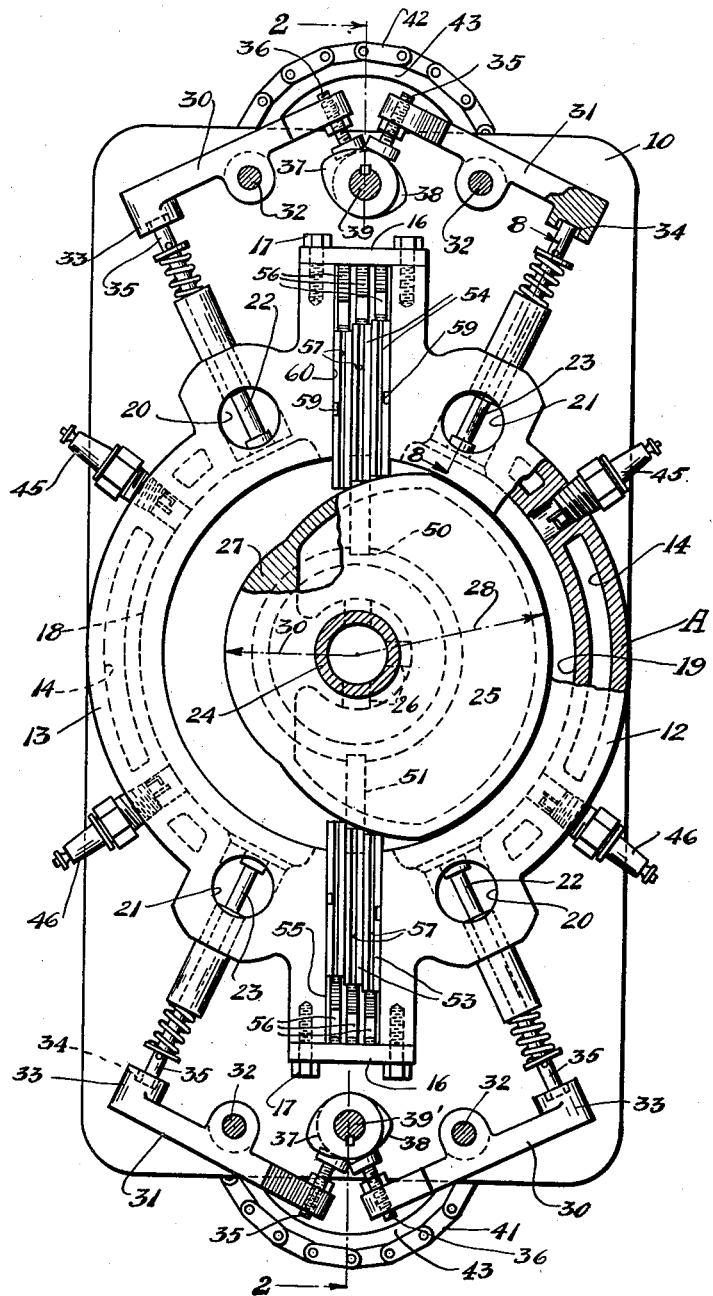
Figure 2:
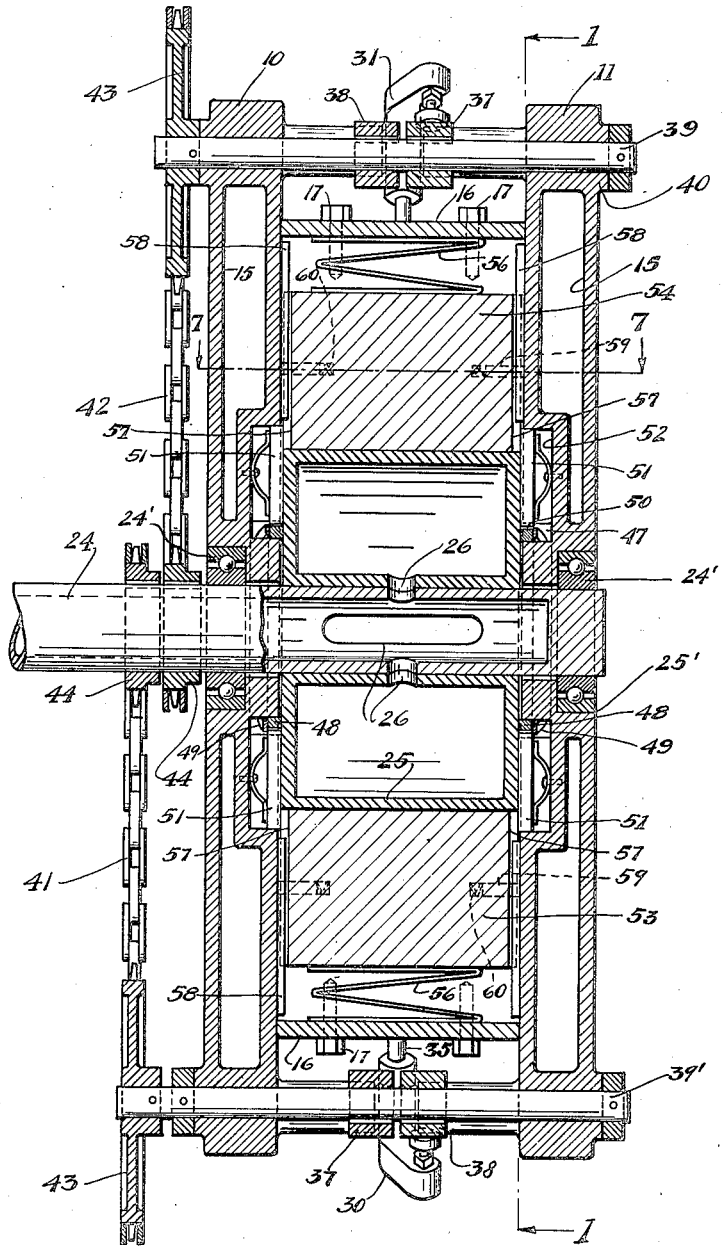

Referring to the drawings, especially to Figs. 1 and 2, 10 and 11 indicate end plates which support a cylinder A comprising separate parts 12 and 13, said parts being fixedly secured to the end plates 10 and 11 by any suitable means. The end plates 10 and 11 and the cylinder parts 12 and 13 are provided with water passages 14 and 15 through which water constantly circulates when the device is operable for the purposes of retaining the various parts at a moderate temperature. The cylinder parts 12 and 13 are arranged in spaced relation with respect to each other and fixed together by means of head plates 16 which are secured to the said parts through means of threaded bolts 17. Formed in the inner circumference of the cylinder parts A are combustion chambers 18 and 19 which are of the same contour as the said cylinder parts and cut into the said parts a suitable distance as will best serve the purpose. The combustion chambers are adapted to receive a charge of explosive fuel or gas through intakes 20, and after explosion has taken place the impure fuel or gas is expelled through exhaust openings 21, this expulsion of the gas being effected through the medium of the rotor, hereafter referred to, said intake and exhaust openings being controlled by spring governed valves 22 and 23 of any approved type.

Passing through the cylinder A is a main drive shaft 24 carrying a rotor 25 which is eccentrically mounted on the said drive shaft and secured thereto by sweating the same thereon or by any other suitable means, said shaft being journalled through suitable bearings 24' arranged in recesses 25' formed in the end plates 10 and 11. As illustrated in the drawings the main drive shaft 24 and the rotor 25 are hollow for the passage of water therethrough, communication between the shaft 24 and the hollow portion of the rotor 25 being accomplished through the provision of openings 26. This construction of the shaft and rotor 25 being such that the said drive shaft and rotor are constantly retained at a moderate temperature. While it has been stated that the rotor 25 is hollow, it will be seen by inspection of Fig. 1 of the drawings, that the portion 27 of the cylinder is solid, this portion being nearest to the axis of the shaft 24 serving as a counter-balance when the rotor 25 is operable. The shape of the rotor 25 is preferably similar to that illustrated in Fig. 1, said piston having its greater portion equal to a diameter about 1/500 of an inch smaller than the diameter of the cylinder opening, such for convenience sake being illustrated by a radius line 28. The shape of the solid portion or counter weight portion 27 of the rotor is determined by a radius of an appropriate length which is determined by the diameter of the bore of the cylinder A and for convenience the radius in this instance is indicated by a radius line 30. The rotor 25 as shown in the drawings is in its dead center position and the operation of the same will be hereinafter set forth.

The intake and exhaust valves 22 and 23, as herein stated, controlling the intake 22 and exhaust 23, are operated by rocker arms 30 and 31 which are pivotally carried by shafts 32 journalled on the end plates 10 and 11. Formed in lateral projections 33 of the rocker arms 30 and 31 are seats 34 into which the stems 35 of the valves 22 and 23 engage. Adjustably carried on the opposite ends of the rocker arms 30 and 31 are tappets 35 and 36 which ride on the peripheries of cam members 37 and 38 carried by shafts 39 and 39' journalled in suitable bearings 40 formed on the end plates 10 and 11. The shafts 39 and 39' are operatively connected to the main drive shaft 24 by sprocket chains 41 and 42 which pass over sprocket gears 43 and 44. The sprocket gears 44 are considerably smaller than the sprocket gears 43, that is about a ratio of 2 to 1, the purpose being such that the shafts 39 and 39' will make one complete rotation to every two complete rotations of the shaft 24. This arrangement is also such that when the shaft is operable the valves 29 and 23 will alternately perform their respective functions. When the charging fluid is admitted into the combustion chambers the same is exploded by a double ignition system which is accomplished by mounting spark plugs 45 and 46, of any approved type, adjacent the opposite ends of each of the combustion chambers, such spark plugs being timed to function in accordance with the position of the rotor 25, as will be readily understood.

To prevent leakage of the charging fluid from one combustion chamber to the other, I provide a number of compensation plates, the construction and arrangement of which are as follows:

Formed in each of the end plates 10 and 11 are annular recesses 47, located a suitable distance from the axis of the shaft 24, for the reception of annular compensation rings 48, of suitable material, which are held in close contact with the adjacent sides of the rotor 25 by means of spring members 49. Cooperating with the annular compensation ring 48 and seated in a recess 50 are oppositely arranged vertically extending compensation plates 51 seated in vertical creases 52 formed in the end plates 10 and 11, such compensation plates 51 being also held in close relation with the adjacent sides of the rotor 25. By this construction the bore of the cylinder A is divided into two portions and the compensation plates 48 and 51 prevent the leakage of the charging fluid from one portion to the other. To prevent the leakage of the charging fluid through the space between the periphery of the rotor 25 and the inner circumference of the cylinder bore I provide compensation plates 53 and 54 which work in the space 55 between the adjacent cylinder parts 12 and 13 and which are held in constant engagement with the periphery of the rotor 25 by means of spring members 56. This construction is such that when the rotor 25 is rotated, the compensation plates 53 and 54 will be forced into the spaces 55 and under such conditions the spring members 56 will resist the inward movement of the compensation plates and force the same against the periphery of the rotor 25. Formed in the opposite ends of the compensation plates 53 and 54 are vertically extending recesses 57 into which lateral ribs 58 engage, said ribs being formed on the adjacent sides of the plates 10 and 11, this construction being such that when the compensation plates 53 and 54 are forced into the spaces 55 they will move in a straight vertical plane. Compensation plates 59 are carried by the outer compensation plates 53 and 54, said plates being arranged in horizontal grooves formed in each of the said outer plates and forced into engagement with the adjacent sides 60 of the cylinder parts 12 and 13 by spring members 61. By the provision of the various compensation plates as illustrated in the drawings and herein set forth, I prevent any possible leakage of the charging fluid from the combustion chambers, said compensation plates being formed of suitable material which will serve the required purpose.

Referring now particularly to Figs. 3 to 6 inclusive and from the description of which the operation of my improved internal combustion engine will be fully understood and which are diagrammatical illustrations of the various cycles of the operation of the rotor, and in which; Fig. 3 illustrates the position the rotor is in when about to begin the firing stroke. In this position of the piston the valves 22 and 23 are closed, (for convenience the left hand cylinder is indicated by the reference character $c$ and the right hand cylinder is indicated by the reference character $d$) and the right hand cylinder $d$ is under compression. In Fig. 4 the rotor is about to make an exhaust stroke through cylinder $c$ and begin its firing stroke from cylinder $d$. In this illustration it will be noted that the valve 23 of the cylinder $c$ is open to permit the passage of the exhaust gas and all other valves of the engine are closed. As I illustrate the various operations of the rotor, it is of course understood, that the spark gaps 45 and 46 are cooperating and functioning with the valves and rotor 25. Referring now to Fig. 5 the rotor, traveling in the direction indicated by the arrow, has just completed its intake stroke through the cylinder $c$ and is about to begin its exhaust stroke through the cylinder *d*. In this illustration it will be noted that the intake valve 22 of cylinder *c* and the exhaust valve 23 of cylinder *d* are both open and the exhaust valve 23 of cylinder *c* and the intake valve 22 of cylinder *d* are both closed. The rotor 25 as illustrated in Fig. 6 is about to make its compression stroke through cylinder *c* and has just completed an intake stroke through cylinder *d* and in this illustration the intake valve 22 of cylinder *d* is the only valve open. As previously stated during the operation of the intake and exhaust valves 22 and 23 and the rotation of the rotor 25 the spark plugs 45 and 46 are also functioning and by providing a double ignition system the charging fluid is rapidly exploded and the driving power is greatly increased. It is also to be noted that during the operation of the rotor the compensation plates 54 and 55 are in constant engagement with the periphery of the rotor thereby preventing any leakage from cylinder *c* into cylinder *d* or vice versa when one cylinder is firing and the other exhausting, or as the case may be.

By closely inspecting Figs. 3 to 6 inclusive and referring to the specification which sets forth the various operative strokes of the rotor, one will be able to readily understand the operation of the engine.

The device herein set forth, and illustrated in the drawings comprises but one section, however, any number of sections can be fitted together in a convenient manner and by doing so will greatly increase the driving power. My improved internal combustion engine is especially adapted to be used as the driving motor of an automobile, aeroplane, or motor boat, or any movable device where an internal combustion engine of this class can be applied.

While I have illustrated and described the preferred form of construction for carrying my invention into effect, this is capable of variation and modification without departing from the spirit of the invention. I, therefore, do not wish to be limited to the precise details of the construction set forth, but desire to avail myself of such variations and modifications as come within the scope of the appended claims.

Having described my invention, what I claim as new and desire to secure by Letters Patent is:

1. In an engine of the class described, the combination of a cylinder, a rotor in the cylinder having a portion in close relation to the wall of the cylinder and a portion in spaced relation thereto, combustion chambers in the wall of the cylinder, intake and exhaust openings for said chambers, and compensation plates and cooperating packing devices in said cylinder acting respectively on the periphery and side walls of said rotor and separating said cylinder into compartments.

2. In an engine of the class described, the combination with the cylinder and drive shaft thereof, of a rotor on said shaft having a portion in close relation to the wall of said cylinder and a portion in spaced relation thereto, combustion chambers formed in the wall of said cylinder, intake and exhaust openings for said chambers, and compensation plates and cooperating packing devices in said cylinder acting respectively on the periphery and side walls of said rotor and separating said cylinder into compartments.

3. In an engine of the class described, the combination with the cylinder and drive shaft thereof, of a rotor eccentrically mounted on said shaft; combustion chambers formed in the inner wall of said cylinder, there being intake openings for introducing a charge of explosive fuel to said chambers; openings to permit explosion of the impure gases after the explosion of said explosive fuel; means controlled by said drive shaft for opening and closing said intake and exhaust openings; ignition means at opposite ends of each of said combustion chambers.

4. In an engine of the class described, the combination with the cylinder and drive shaft thereof, of a rotor eccentrically mounted on said shaft; combustion chambers formed in the inner wall of said cylinder, there being intake openings for introducing a charge of explosive fuel to said chambers; openings to permit expulsion of the impure gases after the explosion of said explosive fuel; means controlled by said shaft for opening and closing said intake and exhaust openings; yieldable means engaging the sides and periphery of said rotor dividing said cylinder into two compartments and preventing the leakage of charging fluid from one of said compartments into the other; and ignition means at opposite ends of each of said combustion chambers.

5. In an engine of the class described, the combination with the cylinder and drive shaft thereof, of a rotor mounted on said shaft, a portion of said rotor being in close relation with respect to the inner wall of said cylinder and the remaining portion of said rotor being in spaced relation with respect to the inner wall of said cylinder; spring control means engaging the side walls and periphery of said rotor dividing said cylinder into two compartments; combustion chambers formed in the inner wall of each of said compartments arranged to receive a charge of explosive fuel; and ignition means at opposite ends of each of said combustion chambers.

6. An engine of the class described, the combination with the cylinder and drive shaft thereof, of a rotor mounted on said shaft, a portion of said rotor being in close relation with respect to the inner walls of said cylinder and the remaining portion of said rotor being in spaced relation with respect to the inner wall of said cylinder; compensation plates engaging said rotor dividing said cylinder into two compartments; combustion chambers formed in the inner wall of said cylinder, there being intake openings for introducing a charge of explosive fuel to said chambers; openings to permit expulsion of the impure gases after the explosion of said explosive fuel; valves controlling said openings; means controlled by said drive shaft for operating said valves, and ignition means at opposite ends of each of said combustion chambers.

7. An engine of the class described comprising end plates fixed in spaced relation with respect to each other; a cylinder comprising two compartments arranged between said end plates and secured thereto; a drive shaft passing through said cylinder; a rotor eccentrically carried by said shaft and adapted to revolve through said compartments, a portion of said rotor being in close relation with respect to the inner wall of said cylinder and the remaining portion of said rotor being in spaced relation with respect thereto; combustion chambers communicating with each of said compartments; openings for introducing a charge of explosive fuel to said chambers; ignition means communicating with each of said combustion chambers; and spring control packing devices engaging the sides and abutments engaging the periphery of said rotor to prevent the leakage of charging fluid from one compartment to the other.

8. An engine of the class described comprising end plates fixed in spaced relation with respect to each other; a cylinder comprising two compartments arranged between said end plates and secured thereto; a drive shaft passing through said cylinder; a rotor eccentrically carried by said shaft and adapted to revolve through said compartments, a portion of said rotor being in close relation with respect to the inner wall of said cylinder and the remaining portion of said rotor being in spaced relation with respect thereto; combustion chambers communicating with each of said compartments, there being intake openings for introducing a charge of explosive fuel to said chambers; openings to permit expulsion of the impure gases after the explosion of said explosive fuel; valves controlling said openings; abutments cooperating with said rotor; oppositely arranged shafts transversing said end plates; rocker arms carried by said shafts and engaging the stems of said valves for opening said valves; means controlled by said drive shaft for imparting a rocking motion to said rocker arms; and ignition means at each end of said combustion chambers.

9. In a rotary internal combustion engine of the class described, the combination with the cylinder and drive shaft thereof, of a rotor eccentrically mounted on said shaft, a portion of said rotor being in close relation with respect the inner wall of said cylinder and the remaining portion of said rotor being in spaced relation with respect to said wall; abutments engaging the periphery and packing devices engaging the side walls of said rotor dividing said cylinder into two compartments; means controlling the movement of said compensation plates; combustion chamber communicating with said compartments, there being intake openings for introducing a charge of explosive fuel to said chambers; openings to permit expulsion of the impure gases after the explosion of said explosive fuel; valves controlling said openings; rocker arms controlled by said drive shaft and engaging the stems of said valves for opening said valves; and ignition means at opposite ends of each of said combustion chambers.

In testimony whereof I have signed my name to this specification.

TRAVIS B. MONK.